(12) United States Patent
Langner et al.

(10) Patent No.: US 11,327,238 B2
(45) Date of Patent: May 10, 2022

(54) HOUSING FOR COUPLING OF LIGHT FROM A LIGHT SOURCE TO AN OPTICAL LIGHT GUIDE

(71) Applicant: Volvo Car Corporation, Gothenburg (SE)

(72) Inventors: Stefan Langner, Henån (SE); Anders Lennartsson, Gothenburg (SE); Markus Andersson, Gothenburg (SE); Mattias Johannesson, Alafors (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/073,474

(22) Filed: Oct. 19, 2020

(65) Prior Publication Data

US 2021/0124126 A1   Apr. 29, 2021

(30) Foreign Application Priority Data

Oct. 23, 2019   (EP) .................................... 19204828

(51) Int. Cl.
*G02B 6/36* (2006.01)
*G02B 6/42* (2006.01)

(52) U.S. Cl.
CPC ......... *G02B 6/3604* (2013.01); *G02B 6/4256* (2013.01); *G02B 6/4298* (2013.01)

(58) Field of Classification Search
CPC .. G02B 6/4446; G02B 6/4237; G02B 6/4204; G02B 6/3604; G02B 6/4256; G02B 6/4298
See application file for complete search history.

(56) References Cited

U.S. PATENT DOCUMENTS

| 3,758,189 A | 9/1973 | Codrino |
| 6,186,650 B1 * | 2/2001 | Hulse .................. B60Q 1/0011 362/459 |

(Continued)

FOREIGN PATENT DOCUMENTS

| JP | 20080291951 A | 12/2008 |
| JP | 4913891 A | 4/2012 |
| WO | 2017046085 A1 | 3/2017 |

OTHER PUBLICATIONS

Mar. 26, 2020 European Search Report issued on International Application No. 19204828.

*Primary Examiner* — Sung H Pak
*Assistant Examiner* — Hoang Q Tran
(74) *Attorney, Agent, or Firm* — Clements Bernard Walker; Christopher L. Bernard

(57) ABSTRACT

A housing for enabling coupling of light from a light source to an optical light guide. The housing allows for the optical light guide to rotate about its axis with respect to the housing and a light source while at the same time maintaining the optical coupling with the light source. Accordingly, it is desirable to couple light from a light source to an optical light guide, where the optical light guide is freely rotatable about its axis. This is obtained by a locking mechanism of the housing where the light source is arrangeable. The locking mechanism includes a circumferential structure adapted to receive at least one radial locking member of the optical light guide. The circumferential structure is configured such that the optical light guide is rotatable about its axis in the locking mechanism while maintaining a spatial relationship between the end portion of the optical light guide and the light source.

19 Claims, 8 Drawing Sheets

(56) References Cited

U.S. PATENT DOCUMENTS

| | | |
|---|---|---|
| 6,267,492 B1 | 7/2001 | Reid et al. |
| 6,880,959 B2 | 4/2005 | Houston |
| 8,382,346 B2 | 2/2013 | Schultheis et al. |
| 2002/0037142 A1* | 3/2002 | Rossi .................... G02B 6/424 385/92 |
| 2002/0037145 A1* | 3/2002 | Irie .................... G02B 6/03622 385/127 |
| 2003/0081430 A1 | 5/2003 | Becker |
| 2003/0216618 A1 | 11/2003 | Arai |
| 2006/0204198 A1* | 9/2006 | Michiels .............. G02B 6/4446 385/135 |
| 2019/0061615 A1 | 2/2019 | Suzuki |

* cited by examiner

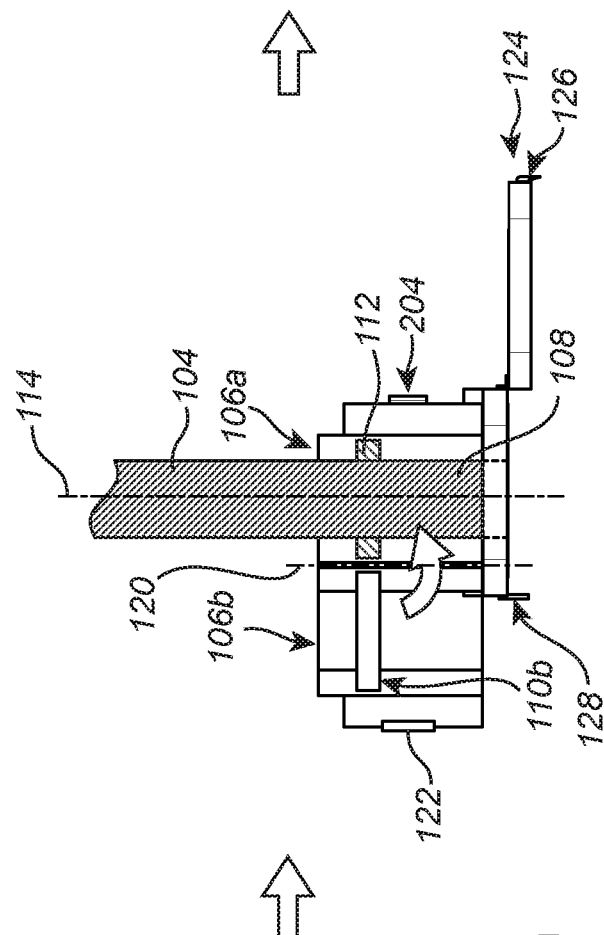
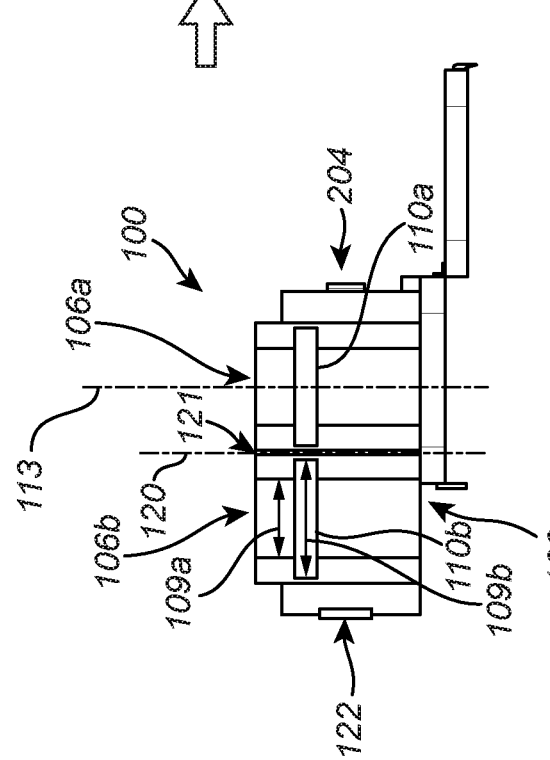

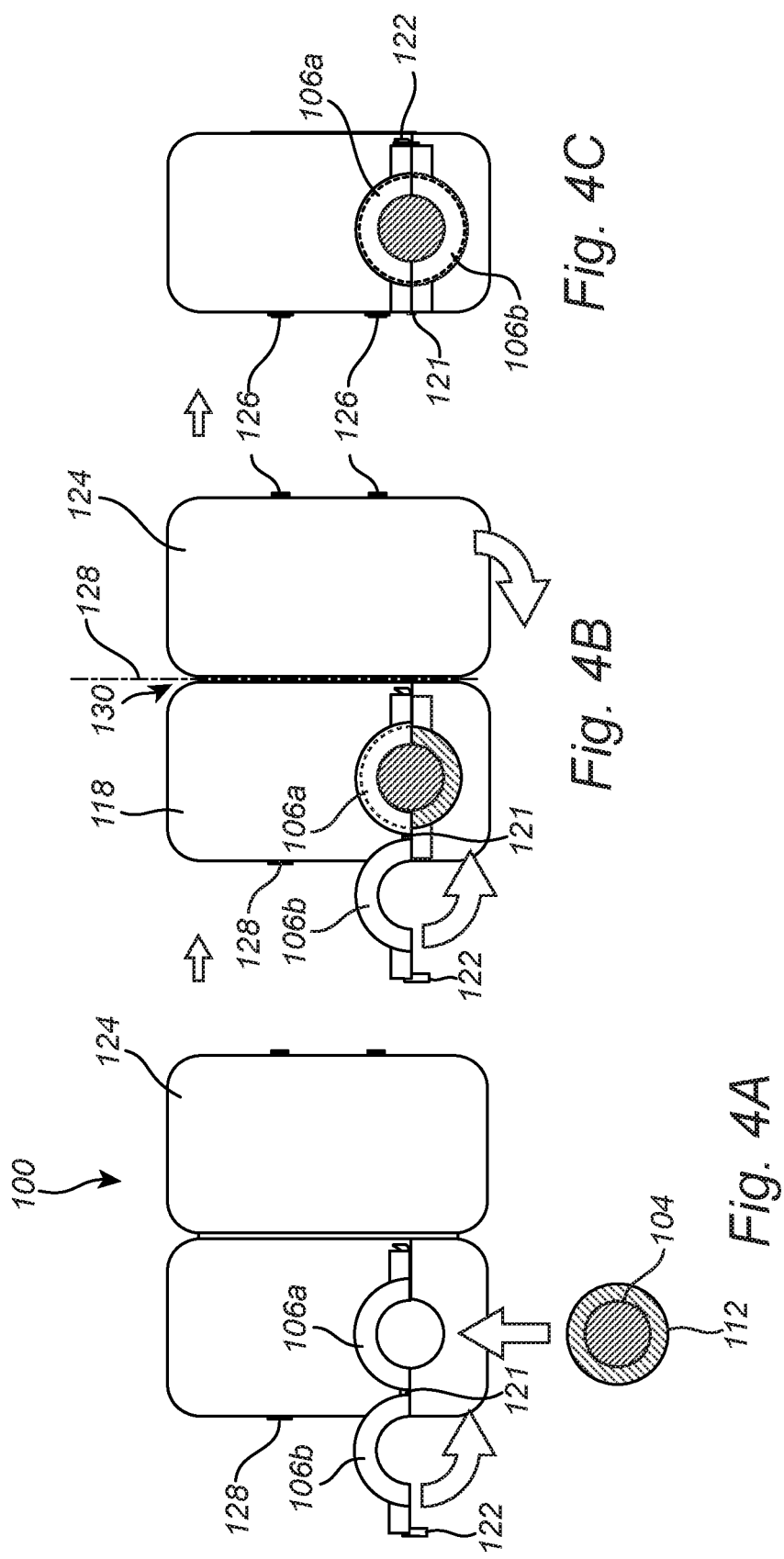

HOUSING FOR COUPLING OF LIGHT FROM A LIGHT SOURCE TO AN OPTICAL LIGHT GUIDE

CROSS-REFERENCE TO RELATED APPLICATION

The present disclosure claims the benefit of priority of co-pending European Patent Application No. 19204828.8, filed on Oct. 23, 2019, and entitled "AN IMPROVED HOUSING FOR COUPLING OF LIGHT FROM A LIGHT SOURCE TO AN OPTICAL LIGHT GUIDE," the contents of which are incorporated in full by reference herein.

TECHNICAL FIELD

The present disclosure generally relates to housing for enabling coupling of light from a light source to an optical light guide.

BACKGROUND

Illumination of components or surfaces is desirable in various situations including in vehicle interiors. For example, it may be desirable to illuminate e.g. door panel components or a centre console. For providing illumination to a preferred location, the light emitted by a light source is often guided by a guiding structure such as an optical fiber, to the preferred location. This also means there must be a coupling between the light source and the guiding structure.

The coupling between the light source and the guiding structure is preferably easily disassembled for replacement of e.g. the light source, or for maintenance. Furthermore, it is desirable to avoid light leakage from the coupling structure, and being able to easily redirected the guiding structure without having to disassemble the guiding structure from the coupling structure.

SUMMARY

The disclosed subject matter generally relates to a housing for enabling coupling of light from a light source to an optical light guide. The housing allows for the optical light guide to rotate about its axis with respect to the housing and a light source while at the same time maintaining the optical coupling with the light source.

Accordingly, it is desirable to couple light from a light source to an optical light guide, where the optical light guide is freely rotatable about its axis. This advantage is obtained by a locking mechanism of the housing where the light source is arrangeable. The locking mechanism includes a circumferential structure adapted to receive at least one radial locking member of the optical light guide. The circumferential structure is configured such that the optical light guide is rotatable about its axis in the locking mechanism while maintaining a spatial relationship between the end portion of the optical light guide and the light source.

The circumferential structure preferably has a circular cross-section.

In one advantageous embodiment, the locking mechanism may include a first portion and a second portion. The first portion is fixed in the housing and includes a first circumferential structure portion. The second portion is rotatable with respect to the first portion and includes a second circumferential structure portion. In this way, in a first rotational orientation of the second portion, the first and second circumferential structure portions are displaced from each other to allow for removal of the optical light guide. Further, in a second rotational orientation of the second portion the first and second circumferential structure portions are adapted to engage with the radial locking members of the optical light guide. Thereby, easy assembly and disassembly of the optical light guide from the housing is enabled by a simple rotational motion of the second locking mechanism portion with respect to the first locking mechanism portion.

Further, by realizing a locking mechanism that encloses the radial locking members of the optical light guide, the housing also provides reduced, or no, light leakage. One such locking mechanism includes a circumferential structure including a trench adapted to receive the radial locking members of the optical light guide.

Further features of, and advantages with, the embodiments of the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF DRAWINGS

These and other aspects of the present disclosure will now be described in more detail, with reference to the appended drawings showing example embodiments of the disclosure, wherein:

FIGS. 2A-E conceptually illustrates locking of an optical light guide in a housing according to embodiments of the present disclosure;

FIG. 4A-C conceptually illustrate the positioning and locking of an optical light guide in a housing shown from a different perspective than in FIGS. 2A-E, according to embodiments of the present disclosure;

DETAILED DESCRIPTION

Figure 1A:
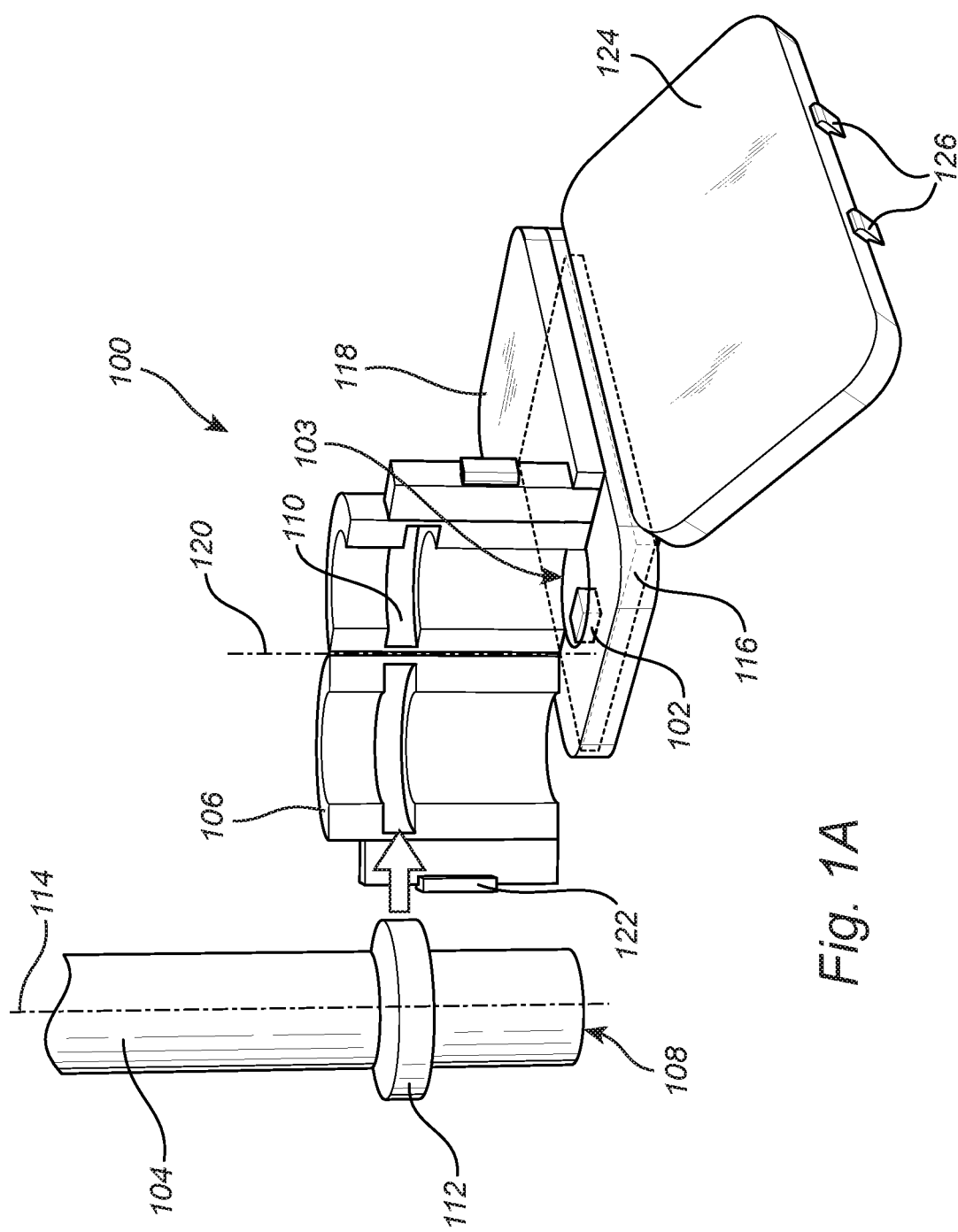
FIG. 1A is a conceptual illustration of a housing according to embodiments of the present disclosure.

In the present detailed description, various embodiments of a housing according to the present disclosure are described. However, the housing may be embodied in many different forms and should not be construed as limited to the embodiments set forth herein; rather, these embodiments are provided for thoroughness and completeness, and to fully convey the scope of the present disclosure to the skilled person. Like reference characters refer to like elements throughout.

Figure 1B:
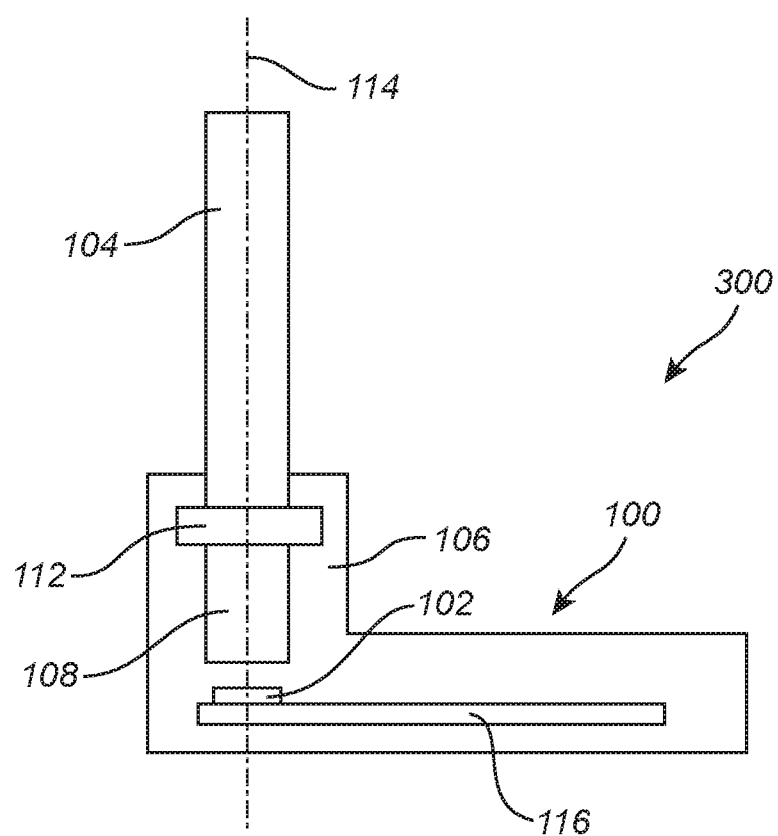
FIG. 1B is a cross-sectional view of an example housing with an optical light guide arranged therein according to embodiments of the present disclosure.

FIG. 1A is a perspective view of an example housing 100 for enabling coupling of light from a light source 102 to an optical light guide 104 according to embodiments of the present disclosure. FIG. 1B is a conceptual side view cross-section of the housing 100 with the optical light guide 104 arranged therein. The housing 100 includes a locking mechanism 106 for maintaining an end portion 108 of the optical light guide 104 in the vicinity of the light source 102 when the light source 102 is mounted in a mounting location 103 in the housing 100 such that light emitted by the light source 102 is coupled into the end portion 108 of the optical light guide 104. The locking mechanism 106 includes a circumferential structure 110 adapted to receive at least one radial locking member 112 of the optical light guide 104 such that the optical light guide 104 is rotatable about its axis 114 in the locking mechanism 106 while maintaining a spatial relationship between the end portion 108 of the optical light guide and the light source 102.

It is desirable to provide a locking mechanism that allows for rotational motion of the optical light guide, that at the same time maintains a spatial relationship between the light source and the end portion of the optical light guide. The locking mechanism locks the optical light guide to maintain in a locking plane but allows for rotation of the optical light guide about its longitudinal axis which is perpendicular to the locking plane. This ensures that the optical light guide is locked in position to maintain the spatial relationship between the end portion of the optical light guide and the light source. The spatial relationship between the end portion of the optical light guide and the light source is important to maintain in order to ensure efficient coupling of light into the optical light guide. The spatial relationship is maintained by the herein disclosed locking mechanism while at the same time allowing for a rotation of the optical light guide about its centre axis.

The spatial relationship is such that the light source is able to efficiently couple light into the optical light guide and includes both the axial distance between the end portion of the optical light guide and the light source and the alignment between the light source and the end portion. Preferably, the light source is aligned with the end portion, e.g. with the centre axis of the optical light guide and located relatively close to the end portion.

The end portion is adapted as an input area or inlet, where the optical light guide receives light that is guided through the optical light guide by e.g. reflections inside the optical light guide, to an outlet of the optical light guide. The outlet is located at or near the location that is desirable to illuminate. Accordingly, the optical light guide may guide light received at the end portion to an outlet of the optical light guide.

The rotation of the optical light guide is preferably free about its centre axis 114, e.g. the optical light guide may rotate at least 360° about its centre axis 114.

The optical light guide may be made from an optical plastic such as PMMA or PC. For example, the optical light guide may be exemplified by an optical fibre.

Circumferential components herein such as the circumferential structures of the locking mechanism are preferably circular, i.e. formed in a circular cylindrical inner surface of the locking mechanism such that the radial locking members of the optical light guide may travel freely in the circumferential structures when the optical light guide is rotated.

The radial locking members of the optical light guide includes a protruding structure in a direction substantially perpendicular to the centre axis 114 of the optical light guide.

The housing is in some embodiments made from a plastic material, e.g. by moulding or 3D-printing. Several types of light sources are conceivable and within the scope of the present disclosure, a non-limiting example includes light-emitting diodes.

The light source 104 may be arranged on a PCB-substrate 116 that is inserted in the housing 100 and held in place by attachment means. Several ways of attaching a PCB in a housing are known and will not be described in detail herein. Such attachment means include screws, snap-connections including pins that penetrate holes in the PCB, electrical connection ports that maintain the PCB in place, etc.

Turning now to FIGS. 2A-E which illustrates the process of locking an optical light guide 104 in a housing 100 according to embodiments of the present disclosure.

FIG. 2A illustrates a side view of the housing 100 with the locking mechanism 106 in an open state. The locking mechanism 106 of the housing includes a first portion 106a and a second portion 106b. The first portion 106a is fixed in the housing and includes a first circumferential structure portion 110a. The first portion 106a may for example be fixed in a body 118, see FIG. 1, of the housing 100. The second portion 106b is rotatable with respect to the first portion 106a and includes a second circumferential structure portion 110b. In other words, the first portion 106a may include one portion of the circumferential structure 110 adapted to lock the optical light guide in place. Consequently, the second portion 106b may include another portion of the circumferential structure 110 adapted to lock the optical light guide 104 in place. The first 110a and second 110b circumferential locking structure portions may be arch-shaped and when joined together, they form a continuous circumferential locking structure with a circular circumference.

FIG. 2B illustrates that an optical light guide 104 is placed with the radial locking member 112 engaged with the first circumferential structure portion 110b. In the rotational orientation of the second portion 106b illustrated in FIG. 2A-B, the first 110a and second 110b circumferential structure portions 110a are displaced from each other to allow for removal or insertion of the optical light guide 104. The second portion 106b of the locking mechanism 106 is rotatable about an axis 120 substantially parallel with the optical light guide's center axis 114 when locked in the locking mechanism 106. Thus, the rotation axis 120 is substantially perpendicular to a plane of the circumferential structure 110.

Figure 2E:
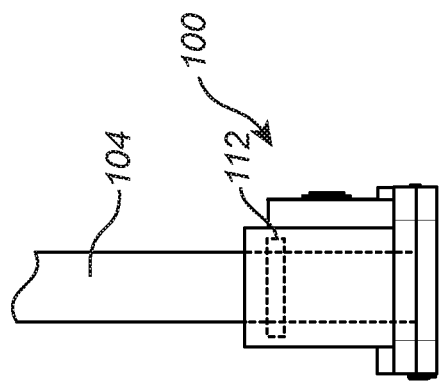
Figure 2D:
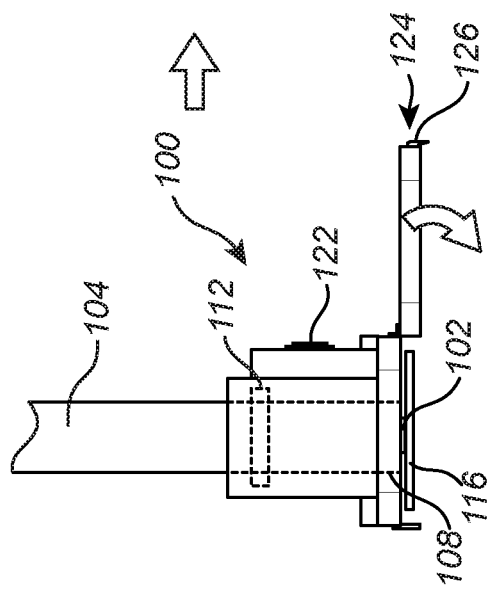
Figure 2C:
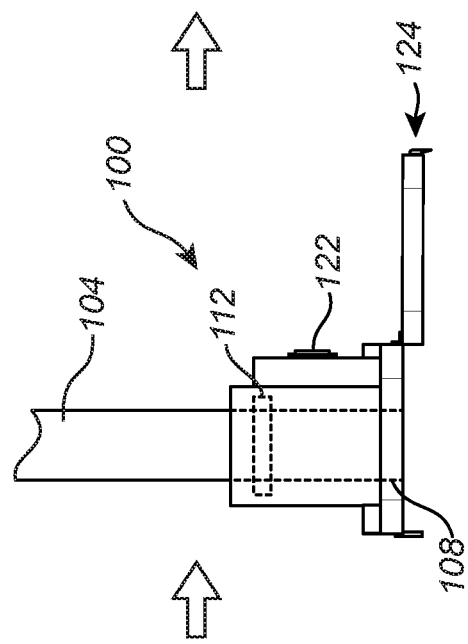

FIG. 2C illustrates a second rotational orientation of the second locking mechanism portion 106b. In this second rotational orientation, the first and second circumferential structure portions 110a-b are adapted to engage with the radial locking members 112 of the optical light guide.

The locking structure 106 forms a through-hole when the first and second portions 106a-b are in locking position, i.e. in the second rotational orientation. Turning again to FIG. 2A, the through-hole, which preferably is cylindrical has a diameter 109a substantially equal to or slightly larger than the diameter of the intended optical light guide's diameter. However, at the location of the circumferential locking structures 110, the diameter 109b is larger than the diameter 109a of the adjacent portions of the through-hole. The circumferential structure 110, including the portions 110a-b, is adapted to allow for the at least one radial locking member 112 to travel along a path of the circumferential structure 110.

The second portion 106b of the locking mechanism may be rotatable with respect to the first portion 106a of the locking mechanism by a hinge connection 121 between the first portion 106a and the second portion 106b. The hinge connection 121 may be an integral part of the housing 100, made from a flexible piece of plastic.

The second portion 106b of the locking mechanism 106 may be adapted to be locked in place in the second rotational orientation illustrated in FIG. 2C. For this, the second portion 106b of the locking mechanism may include a locking member 122 adapted to be snap-fitted with a respective locking member on the body of the housing 100. This will be described in more detail with reference to FIG. 5A-B.

Turning now to FIG. 2D which illustrates a light source 102 such as a light-emitting diode arranged on a PCB-substrate 116 being arranged below the optical light guide, close to the end-portion 108 such that efficient coupling of light into the optical light guide is ensured.

The housing 100 includes a lid portion 124 rotatable with respect to a body 118 of the housing. In a first rotational orientation of the lid portion 124, shown in FIG. 2D, a light source 102 is mountable through an opening in the body of the housing. In a second rotational orientation, shown in FIG. 2E, of the lid portion the opening is closed and maintained closed by a locking member 126 adapted to be snap-fitted with a respective locking member 128 on the body 118. Thus, by means of the disclosed housing including the lid portion 124 and the hinged locking mechanism 106, the optical light guide inside the housing is fully covered to reduce light leakage from the housing while maintaining the critical spatial relationship between the end portion 108 of the optical light guide 104 with the light source 102. Furthermore, due to the herein disclosed circumferential locking mechanism 110, the optical light guide 104 is rotatable about its center axis 114. In addition, replacement of the optical light guide 104 and the light source 102 is made in a simple way by the configuration of the lid portion 124 and the hinged locking mechanism 106, in particular when implementing the suggested snap-fit locking.

Figure 3:
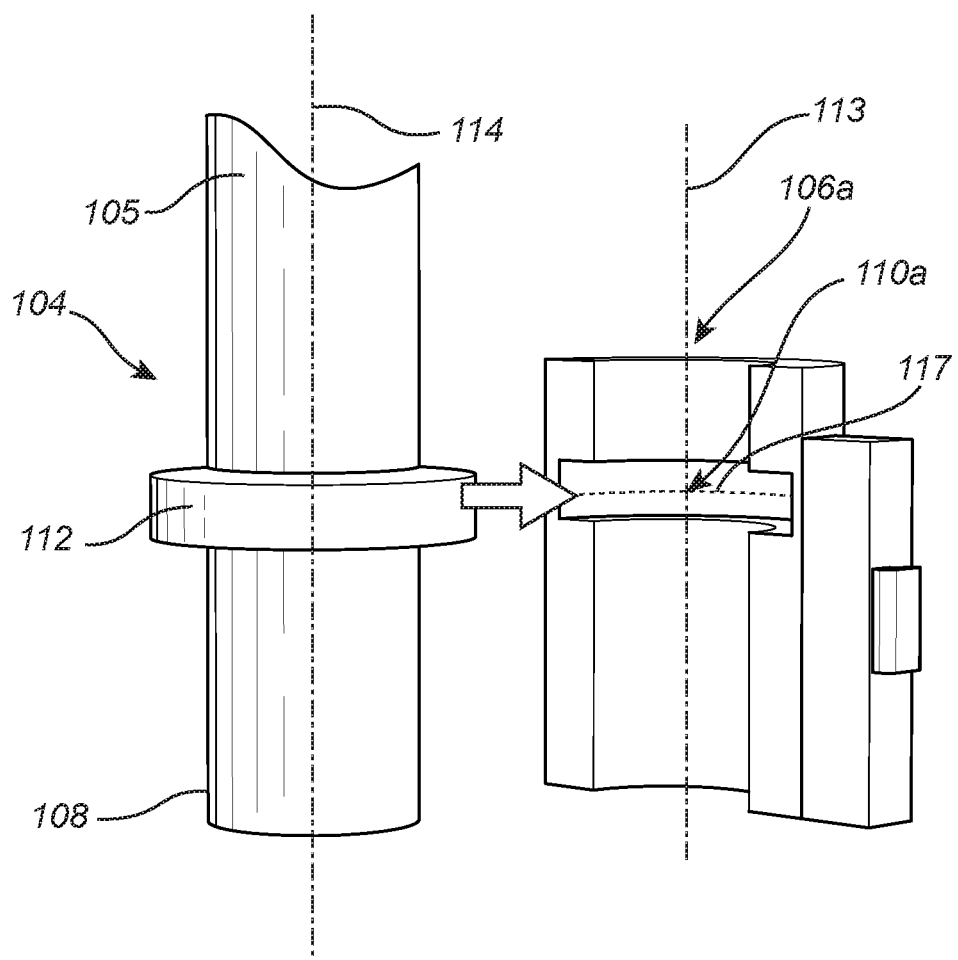
FIG. 3 is close-up view of the locking mechanism including a circumferential structure according to embodiments of the present disclosure.

FIG. 3 is a close-up view of the locking mechanism including the circumferential structure 110a according to some embodiments. FIG. 3 illustrates the first locking member 106a and the first circumferential structure 110a. Here, the circumferential structure 110a includes a trench adapted to receive the radial locking members 112 of the optical light guide. The trench is shaped such that the radial locking members 112 fits in the trench, preferably the height of the trench in a direction along a center axis 113 of the through-hole where the optical light guide 104 is arranged, creates a tight fit with the radial locking member to reduce the possible motion of the optical light guide along its center axis 114. The circumferential structures 110a-b are adapted to allow for the at least one radial locking member 112 to travel along a path 117 of the circumferential structure 110.

The radial locking member may be a single protrusion from the main body 105 of the optical light guide 104. The radial locking member 112 may extend around the entire circular circumference of the optical light guide, or the radial locking member 112 may extend around a portion of circular circumference of the optical light guide.

FIG. 4A-C conceptually illustrate a top view of the positioning and locking of an optical light guide 104 in the housing 100. In FIG. 4A, a first rotational orientation of the second portion 106b of the locking mechanism 106 with respect to the first portion 106a is shown, see also FIG. 2A-B. The optical light guide 104 including the radial locking member 112 is inserted in the arch-shaped first locking mechanism portion 106a, see FIG. 4B. Thus, the first 110a and second 110b circumferential structure portions, better seen in FIG. 2A-B are displaced from each other to allow for removal and insertion of the optical light guide 104. Next, the second portion 106b is rotated with respect to the first portion 106a which is attached to the body 118, and in a second rotational orientation of the second portion 106b, the first 110a and second 110b circumferential structure portions are adapted to engage with the radial locking member 112 of the optical light guide 104. Accordingly, the optical light guide 104 is placed in the locking mechanism 106 which locks it in place by enclosing the optical light guide 104 around its circumference.

A lid portion 124 is rotatable with respect to a body 118 of the housing 100, wherein in a first rotational orientation of the lid portion 124 a light source is mountable through an opening in the body of the housing, and in a second rotational orientation of the lid portion the opening is closed. The lid portion 124 is rotatable about the axis 128. The axis 128 is perpendicular to the rotation axis 120 of the second portion 106b of the locking mechanism 106. The lid portion may be rotatable with respect the body 118 of the housing by a hinge connection 130 between the lid portion 124 and the body 118 of the housing 100. The hinge portion may extend along substantially the entire side length of the lid portion 124 and the adjacent body 118 side.

The lid portion 124 may include a locking member 126 adapted to be snap-fitted with a respective locking member on the body 118 of the housing in the second rotational orientation of the lid portion 124. The second rotational orientation of the lid portion is conceptually illustrated in FIG. 4C and FIG. 2E.

Figure 5B:
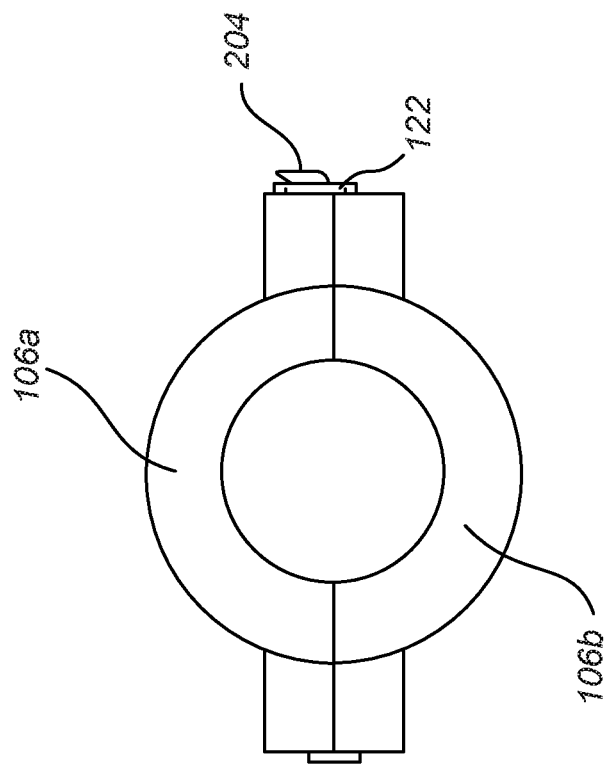
FIGS. 5A-B conceptually illustrates an exemplary snap-fit connection according to embodiments of the present disclosure.
Figure 5A:
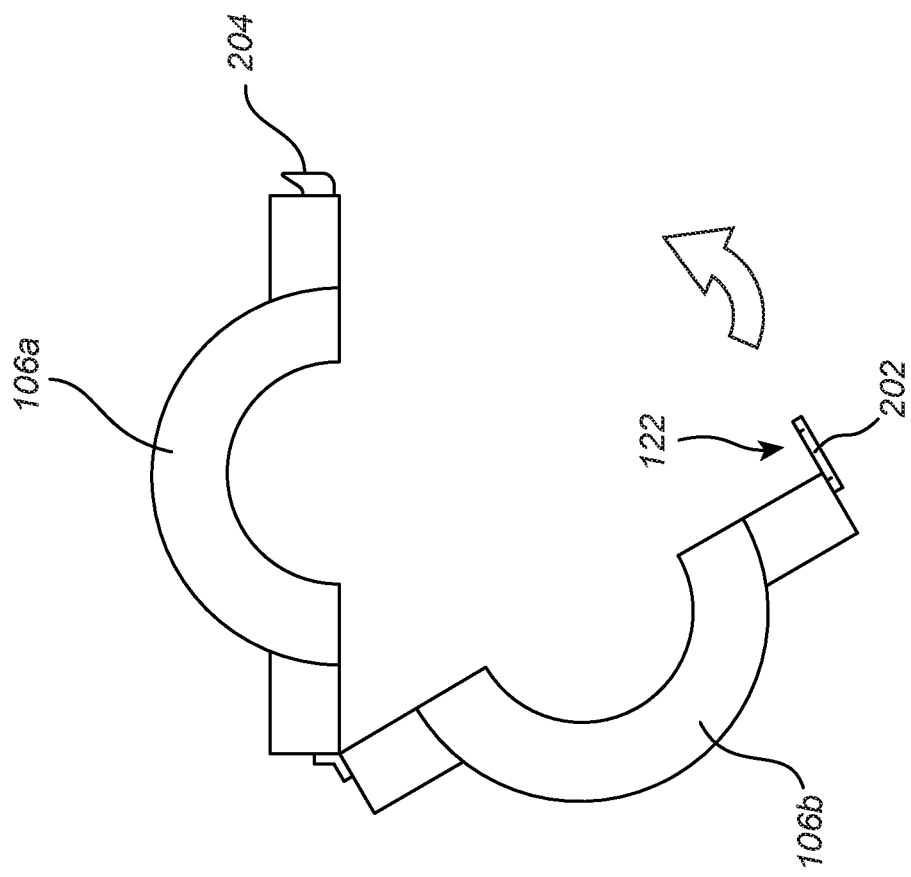

FIG. 5A-B conceptually illustrates an exemplary snap-fit connection according to embodiments of the disclosure. Here the snap-fit connection is exemplified with reference to the locking mechanism 106 by is equally applicable to the lid portion 124 being lockable by the locking members 126, and 128.

Here, the second portion 106b of the locking mechanism includes the locking member 122 which has through-hole 202. When the second portion 106b is rotated towards the second rotational orientation, as illustrated in FIG. 5B, the locking member 202 is pushed against a protrusion 204 of the first portion 106a, such that the locking member 122 is slightly bent in a resilient manner. Once the though hole 202 reaches the protrusion 204, the locking member 122 flexes back and the protrusion 204 falls into the though hole 202, whereby the second locking element 106b is locked in place in the second rotational orientation, see e.g. FIG. 5B and FIG. 4C. A similar locking mechanism may be implemented for locking the lid portion 124 to the housing body 118. For example, the locking member 126 may include a through-hole and the associated matching locking member 128 on the housing body 118 may include a protrusion.

FIG. 1B further conceptually illustrates an optical assembly 300 including a housing 100 according to embodiments of the present disclosure, a light source 102, and an optical light guide 104.

Figure 6:
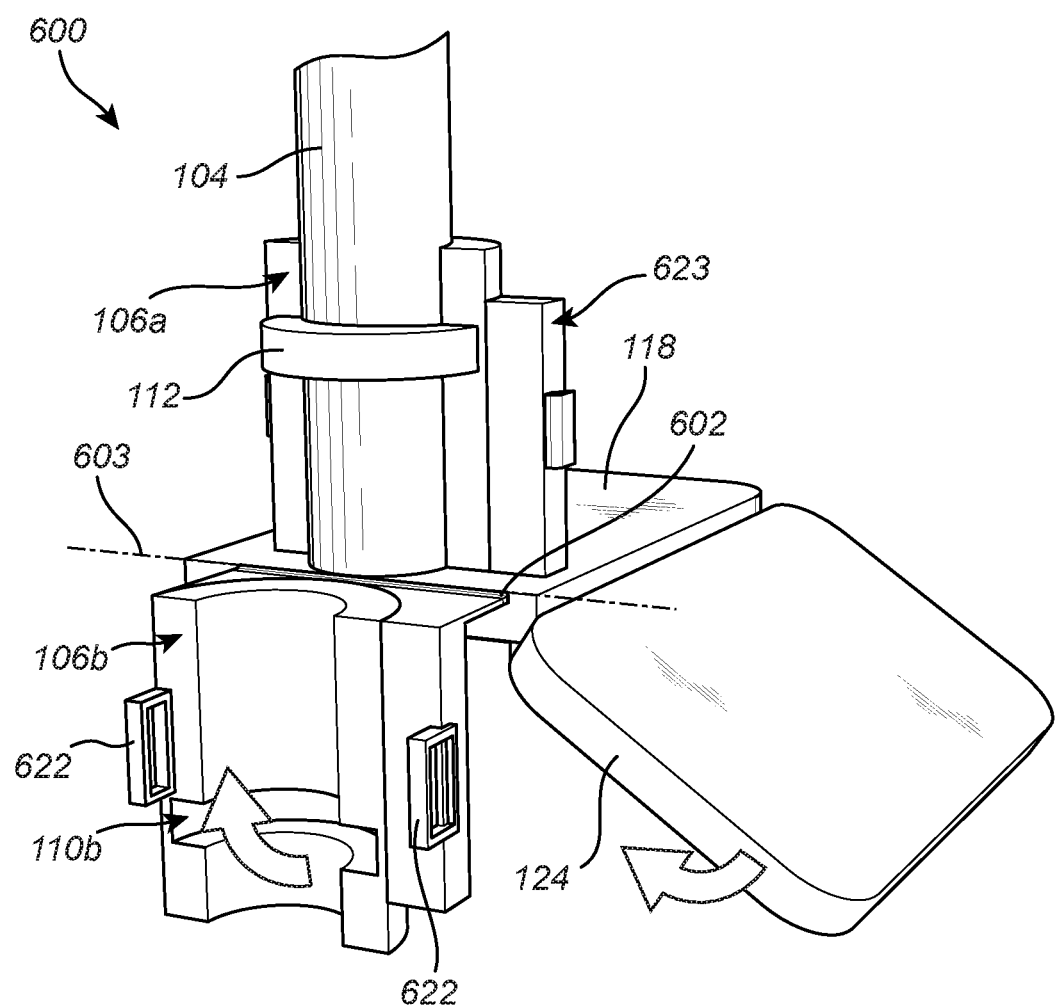
FIG. 6 is a conceptual illustration of a housing according to embodiments of the present disclosure.

In the above described embodiments, the second locking member 106b is rotated about an axis substantially parallel with the central axis 113, see e.g. FIG. 3 and FIG. 2A, of the locking mechanism 106, also parallel to the optical light guide's main axis 114 once installed in the housing 100. The locking mechanism 106 is adapted for maintaining an end portion of the optical light guide in the vicinity of the location of the light source 102 when the light source is mounted in a mounting location in the housing 100 such that light emitted by the light source is coupled into the end portion of the optical light guide. The locking mechanism 106 includes a circumferential structure 110 adapted to receive at least one radial locking member 112 of the optical light guide such that the optical light guide is rotatable about its axis in the locking mechanism while maintaining a spatial relationship between the end portion of the optical light guide and the light source. A difference between the embodiment shown in FIG. 1A and the housing 600 shown in FIG. 6 is that a second locking member 106b may be rotationally attached to the body 118 of the housing 100. Thus, the second locking mechanism 106b is here attached via a hinge connection 602 to the body 118 such that the second locking mechanism may be rotated about an axis 603 from a first rotational orientation to the second rotational orientation in which the optical light guide 104 is locked by the circumferential locking structure 110 including the circumferential locking structure portions 110a-b. The axis 603 is perpendicular to the axis of the optical light guide 104 when it is installed in the housing 600. The second locking mechanism portion 106b may include locking members 622 that may be snap-fitted to matching locking members 623 on the first locking portion 106a. Here, the locking members 622 are provided as claws that grip a shoulder 623 on the first locking portion 106a.

There is further provided a vehicle including any one of the herein disclosed housings, or optical assemblies.

The person skilled in the art realizes that the present disclosure by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

Various examples have been described. These and other examples are within the scope of the following claims.

The invention claimed is:

1. A housing for enabling coupling of light from a light source to an optical light guide, the housing comprising:
   a locking mechanism for maintaining an end portion of the optical light guide in the vicinity of the light source when the light source is mounted in a mounting location in the housing such that light emitted by the light source is coupled into the end portion of the optical light guide,
   wherein the locking mechanism includes a circumferential structure formed in the housing and extending around an entire inner circumference of the locking mechanism and adapted to receive at least one radial locking member of the optical light guide, the circumferential structure adapted such that the at least one radial locking member can travel freely in the circumferential structure when the optical light guide is rotated about its axis such that the optical light guide is rotatable about its axis in the locking mechanism while maintaining a spatial relationship between the end portion of the optical light guide and the light source.

2. The housing according to claim 1, wherein the locking mechanism includes a first portion and a second portion,
   wherein the first portion is fixed in the housing and includes a first circumferential structure portion, and the second portion is rotatable with respect to the first portion and includes a second circumferential structure portion, and
   wherein in a first rotational orientation of the second portion, the first and second circumferential structure portions are displaced from each other to allow for removal of the optical light guide, and in a second rotational orientation of the second portion, the first and second circumferential structure portions are adapted to engage with the radial locking members of the optical light guide.

3. The housing according to claim 2, wherein the second portion of the locking mechanism is rotatable with respect to the first portion of the locking mechanism by a hinge connection between the first portion and the second portion.

4. The housing according to claim 2, wherein the second portion of the locking mechanism is rotatable about a rotation axis substantially perpendicular to a plane of the circumferential structure.

5. The housing according to claim 2, wherein the second portion of the locking mechanism is adapted to be locked in place in the second rotational orientation.

6. The housing according to claim 5, wherein the second portion of the locking mechanism includes a locking member adapted to be snap-fitted with a respective locking member on a body of the housing.

7. The housing according to claim 1, wherein the circumferential structure is adapted to allow for the at least one radial locking member to travel along a path of the circumferential structure.

8. The housing according to claim 1, wherein the circumferential structure includes a trench adapted to receive the radial locking members of the optical light guide.

9. The housing according to claim 1, comprising a lid portion rotatable with respect to a body of the housing, wherein in a first rotational orientation of the lid portion a light source is mountable through an opening in the body of the housing, and in a second rotational orientation of the lid portion the opening is closed.

10. The housing according to claim 9, wherein the lid portion is rotatable with respect the body of the housing by a hinge connection between the lid portion and the body of the housing.

11. The housing according to claim 9, wherein the lid portion includes a locking member adapted to be snapped fitted with a respective locking member on the body of the housing in the second rotational orientation of the lid portion.

12. The housing according to claim 1, wherein the locking mechanism is adapted to enclose the entire circumference of the optical light guide.

13. The housing according to claim 1, wherein the locking mechanism is adapted to lock the optical light guide in place in a plane of the circumferential structure.

14. The housing according to claim 1, wherein the housing is adapted to enclose the light source and the end portion of the optical light guide.

15. The housing according to claim 1, wherein the circumferential locking mechanism includes arch-shaped portions.

16. The housing according to claim 1, wherein the circumferential locking mechanism is circular.

17. The housing according to claim 1, wherein the light source is a light emitting diode.

18. An optical assembly including the housing according to claim 1, a light source, and an optical light guide.

19. A vehicle comprising the optical assembly according to claim 18.

* * * * *